(12) United States Patent
Wehrle et al.

(10) Patent No.: US 9,977,948 B2
(45) Date of Patent: May 22, 2018

(54) METHOD FOR THE LOCALIZATION OF GRIPPING POINTS OF OBJECTS

(71) Applicant: SICK AG, Waldkirch/Breisgau (DE)

(72) Inventors: Klemens Wehrle, Winden (DE); Heinrich Hippenmeyer, Freiamt (DE); Hubert Uhl, Waldkirch (DE); Björn Denz, Denzlingen (DE); Martin Grafmüller, Freiamt (DE)

(73) Assignee: SICK AG, Waldkirch/Breisgau (DE)

( * ) Notice: Subject to any disclaimer, the term of this patent is extended or adjusted under 35 U.S.C. 154(b) by 64 days.

(21) Appl. No.: 15/000,697

(22) Filed: Jan. 19, 2016

(65) Prior Publication Data

US 2016/0217317 A1    Jul. 28, 2016

(30) Foreign Application Priority Data

Jan. 23, 2015  (DE) .................. 10 2015 100 983

(51) Int. Cl.
*G06K 9/00*       (2006.01)
*B25J 9/16*       (2006.01)
(Continued)

(52) U.S. Cl.
CPC ........ *G06K 9/00201* (2013.01); *B25J 9/1612* (2013.01); *B25J 9/1697* (2013.01);
(Continued)

(58) Field of Classification Search
CPC . G06K 9/00201; G06K 9/2018; B25J 9/1612; B25J 9/1697; G01S 17/023;
(Continued)

(56) References Cited

U.S. PATENT DOCUMENTS

| 5,038,258 A | 8/1991 | Koch et al. |
| 5,912,934 A | 6/1999 | Acks et al. |

(Continued)

FOREIGN PATENT DOCUMENTS

| DE | 3635076 A1 | 4/1988 |
| DE | 3906555 A1 | 7/1989 |

(Continued)

OTHER PUBLICATIONS

European Search Report dated Jun. 13, 2016 issued in corresponding European Application No. 16 15 1074.

(Continued)

*Primary Examiner* — Duy M Dang
(74) *Attorney, Agent, or Firm* — Nath, Goldberg & Meyer; Jerald L. Meyer

(57) ABSTRACT

The invention relates to a method for the localization of gripping points of objects, wherein the objects are scanned by means of a 3D sensor and the objects are illuminated by means of at least one first illumination unit while the objects are detected by means of a camera, wherein the relative positions of the 3D sensor, of the first illumination unit and of the camera with respect to one another are known and the 3D sensor, the first illumination unit and the camera are arranged in a fixed position with respect to one another. In this respect, the boundary of the objects is determined from a two-dimensional image generated by the camera, a spatial position is determined from detected distance information of the 3D sensor and of the two-dimensional image and the gripping points for the objects are determined from the boundaries and from the spatial position of the objects.

19 Claims, 2 Drawing Sheets

Figure 1:
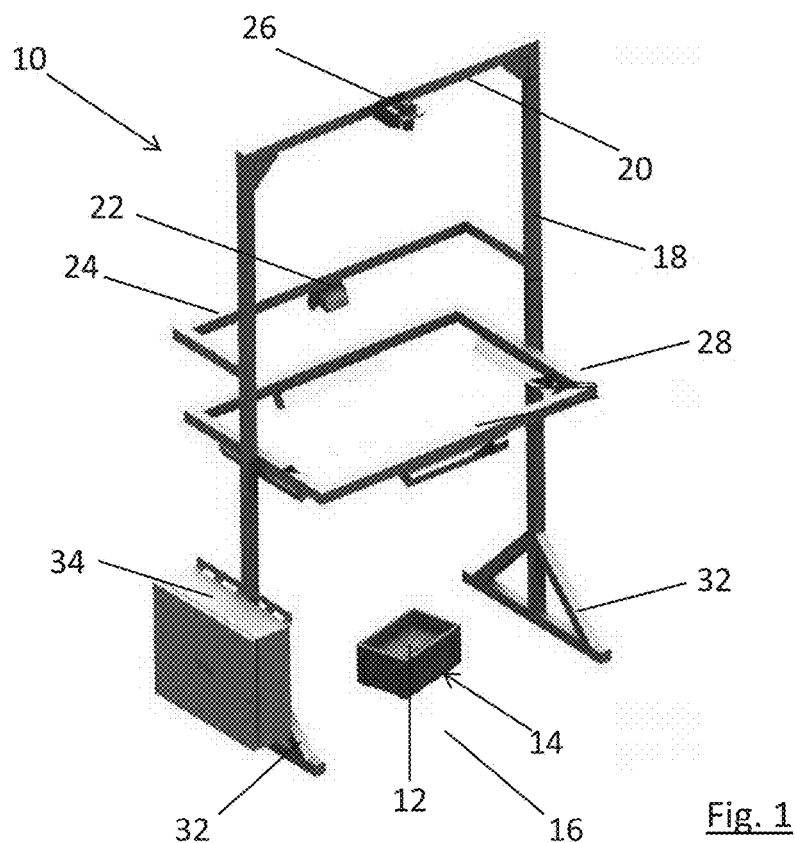

(51) Int. Cl.
*G01S 17/02* (2006.01)
*G01S 17/42* (2006.01)
*G01S 17/89* (2006.01)
*G06T 5/20* (2006.01)
*H04N 13/02* (2006.01)
*G06K 9/20* (2006.01)

(52) U.S. Cl.
CPC ............ *G01S 17/023* (2013.01); *G01S 17/42* (2013.01); *G01S 17/89* (2013.01); *G06K 9/2018* (2013.01); *G06T 5/20* (2013.01); *H04N 13/0203* (2013.01); *G05B 2219/39542* (2013.01); *G05B 2219/45063* (2013.01); *Y10S 901/09* (2013.01); *Y10S 901/47* (2013.01)

(58) Field of Classification Search
CPC   G01S 17/42; G01S 17/89; G06T 5/20; H04N 13/0203
See application file for complete search history.

(56) References Cited

U.S. PATENT DOCUMENTS

| | | | |
|---|---|---|---|
| 6,023,044 A * | 2/2000 | Kosaka | B23K 9/025 219/124.34 |
| 6,617,602 B2 | 9/2003 | Kodama et al. | |
| 7,171,041 B2 | 1/2007 | Watanabe et al. | |
| 7,966,094 B2 | 6/2011 | Ban et al. | |
| 7,983,487 B2 | 7/2011 | Agrawal et al. | |
| 2002/0034327 A1* | 3/2002 | Watanabe | B25J 9/1697 382/152 |
| 2013/0156262 A1 | 6/2013 | Taguchi | |

FOREIGN PATENT DOCUMENTS

| | | |
|---|---|---|
| DE | 19607258 A1 | 8/1997 |
| DE | 60100823 T2 | 7/2004 |
| DE | 102006036346 A1 | 2/2008 |
| DE | 102007045277 A1 | 4/2009 |
| DE | 10081029 B4 | 2/2013 |
| EP | 1190818 A2 | 3/2002 |
| EP | 1905548 A2 | 4/2008 |
| EP | 2058761 B1 | 5/2009 |

OTHER PUBLICATIONS

Porrill. J. et al.. Tina : A 3d vision system for pick and place. Proceedings of the Alvey Vision Conference(AVC87), 65-72, 1987.
A. Agrawal, Y. Sun, J. Barnwell and R. Raskar , "Vision guided robot system for picking objects by casting shadows" , Int. Journal of Robotics Research , vol. 29 , pp. 155-173 , 2010.

* cited by examiner

METHOD FOR THE LOCALIZATION OF GRIPPING POINTS OF OBJECTS

The present invention relates to a method for the localization of gripping points of objects, in particular of objects arranged closely next to one another.

Gripping robots or automatic pick and place units are in particular used in material flow technology and in automation technology to move packages, individual components, prefabricated components or similar and to supply them to further worksteps.

To ensure a secure handling of these objects, the spatial location and the spatial extent of the objects must be known as accurately as possible to determine suitable points of engagement—the so-called gripping points—for a gripping arm, for example.

Laser scanners can be used, for example, to detect the three-dimensional location of objects and their dimensions. The individual objects can in particular only be distinguished from one another with difficulty with objects arranged very closely next to one another due to the frequently deficient resolution of laser scanners. As a result, laser scanners of considerably higher quality and thus of greater cost have to be used in order also to be able to distinguish densely packed objects from one another.

It is the underlying object of the invention to provide a method for the localization of gripping points, in particular with objects arranged closely to one another, which allows a reliable distinction of individual objects and is simultaneously inexpensive and can thus be carried out economically.

This object is satisfied in accordance with the invention by a method in accordance with claim 1. The method in accordance with the invention in this respect provides that the objects are scanned by means of a 3D sensor. In addition, the objects are also illuminated by means of at least one first illumination unit while the objects are detected by means of a camera. In this respect, the relative positions of the 3D sensor, of the first illumination unit and of the camera with respect to one another are known and the 3D sensor, the first illumination unit and the camera are arranged in fixed positions with respect to one another. The boundaries of the objects are determined from a two-dimensional image generated by the camera and a spatial position of the objects is determined from the detected distance information of the 3D sensor and from the two-dimensional image. The gripping points for the objects are determined from the boundaries and from the spatial position of the objects.

The invention is based on the recognition in this respect that it is possible to dispense with a particularly high-resolution and thus expensive laser scanner in that the spatial position of the objects and thus the gripping points are generated by means of a fusion of the distance information of the 3D sensor and of the two-dimensional image of the camera. In addition, due to the illumination of the objects by means of the first illumination unit from a known and predefined direction, the distinguishability of the individual objects in the two-dimensional image of the camera can be improved.

The invention thus utilizes the synergistic effects of the combination of a 3D sensor, of a camera and of an illumination unit in order also to make possible a secure distinction of objects arranged closely to one another using standard components. A reliable and simultaneously particularly inexpensive and thus economic determination of the gripping points of objects is possible in this manner.

The 3D sensor used in the method can in particular be a conventional laser scanner which detects additional distance information or depth information, for example via a time-of-flight measurement. Alternatively, the 3D sensor can be a stereo camera, a TOF camera (time of flight camera) and the like. The camera for taking the two-dimensional images can be a CCD camera or a CMOS camera. A two-dimensional image built up of individual pixels is in particular taken by the camera in color, in gray values or in black and white.

Since the first illumination unit is arranged in a fixed position relative to the camera and to the 3D sensor, the illumination by the first illumination unit takes place from a predefined direction. The two-dimensional image generated by the camera can thus in particular be utilized e.g. to recognize edges of the objects by means of shadows cast in the direction of illumination. The boundary of the objects can be deduced from the edges. This means that the spatial extent of the objects can be determined.

In this respect, the boundary of an object visible in the two-dimensional image of the camera is in particular set into a size relation by means of the distance information of the 3D sensor to determine the spatial position and the actual size of the object.

The fact is thus used in accordance with the invention that the individual objects can be easily distinguished by means of the camera and their spatial position can be determined by means of the additional distance information of the 3D sensor. Once the spatial position and the extent of an object are known, the geometrical center of mass of the object can be determined, for example. A gripping point of the object can then in particular be at the center of mass or above the center of mass if only one gripping point is required and the object is raised by means of a vacuum, for example. Alternatively, the gripping points can also be determined such that e.g. two gripping points always form an imaginary connection line which runs through the geometrical center of mass. As a rule, the geometrical center of mass and the physical center of mass are at least close to one another in the gripping plane so that a tilting or slipping of the object during the gripping can in particular be prevented in this matter.

Advantageous embodiments of the present invention are set forth in the description, in the drawings and in the dependent claims.

In accordance with an advantageous embodiment, the objects are also at least illuminated by a second, third and fourth illumination unit while the objects are detected by means of the camera, with the illumination units being arranged spatially offset from one another. The illumination units can also be arranged in fixed positions relative to one another.

The illumination units can furthermore in particular generate a planar and homogeneous illumination of the objects. For this purpose, the illumination units can be elongate and can emit light over their total longitudinal extents. LED strips are therefore in particular suitable for illuminating the objects. An illumination unit can generally also comprise a plurality of illuminants.

Due to the spatial offset of the illumination units with respect to one another, the objects can be illuminated from different spatial directions, which results in a reduction of shadows. The objects are then uniformly illuminated, whereby the spatial boundary of the objects in the two-dimensional image of the camera can be determined in a particularly simple manner since unwanted shadows which lead to misinterpretations are reduced. In addition, the shadows at the object edges differ due to the spatial offset of the illumination units so that the objects can be localized better and thus more precisely.

The illumination units are in particular arranged such that the objects can substantially be illuminated from four directions respectively laterally offset by 90° from one another ("North", "East", "South", "West"). "Laterally offset" should mean in this respect that the directions of illumination projected onto that plane in which the illumination units are arranged include a corresponding angle (that is here 90°) between them in this plane. Alternatively, a circular arrangement of the illumination units and/or the use of more than four illumination units is/are also possible.

The illumination units are preferably activated one after the other, with the camera detecting the objects and respectively generating a two-dimensional image on activation of each illumination unit. In the above-explained example with four illumination units which each have directions of illumination laterally offset by 90° with respect to one another four two-dimensional images are thus generated, with the shadows cast in each image respectively differing by approximately 90°.

Alternatively, all the illumination units can also be active simultaneously, with then the generation of a single two-dimensional image being sufficient.

In accordance with a further advantageous embodiment, a maximum image is generated from a respective two two-dimensional images generated by the camera, with a gradient filtering being carried out on the maximum image to generate an edge image and with a respective two edge images being fused to a first result image by means of a minimum formation.

Two images generated by the camera are preferably used for the maximum image which were created on an illumination using oppositely disposed illumination units. A maximum image can, for example, be generated from an image illuminated by the illumination unit "North" and from an image illuminated by the illumination unit "South". On the generation of the maximum image, a comparison of the two two-dimensional images generated by the camera is carried out for each picture element and that picture element is taken over into the maximum image which has the higher value, that is which is brighter—in a black and white image or a gray scale image. The shadows which arise on the illumination can be eliminated by means of the maximum image.

The maximum image can finally be subjected to a gradient filtering, wherein the direction of the gradient filtering corresponds to the direction of the illumination of one of the two starting images generated by the camera. An edge image which is a two-dimensional image having emphasized edges is created by the gradient filtering. Alternatively, a matrix edge filter can, for example, also be used instead of the gradient filtering.

Two respective edge images can subsequently be fused to a first result image by means of a minimum formation. In the minimum formation, analog to the generation of the maximum image, the respective picture element having the lower value is taken over into the first result image from the two edge images for each picture element. The first result image is thus created from the combination of two edge images, with one edge image in turn respectively being generated from two images generated by the camera. In the result image, the boundaries or objects are particularly easily visible due to the elimination of the shadows and due to the emphasized edges.

Alternatively to the illumination using four illumination units, the objects can also be illuminated by the first illumination unit and/or by a second illumination unit using a stripe pattern while the objects are detected by means of the camera. The first illumination unit and the second illumination unit can in particular make possible an illumination from directions laterally offset by 90° or 180°. The second illumination unit can be arranged in a fixed position with respect to the first illumination unit.

To generate the stripe pattern, the illumination units can in particular be projectors or can project the stripe pattern onto the objects by means of a movable laser source. Different lines and stripe patterns can be projected onto the objects by means of the illumination units. To detect the objects in their entirety, "migrating" or mutually inverse patterns can also be used after one another which can in particular also have an encoding. Patterns with lines in different directions as well as checkerboard patterns or check patterns and the like can be used, for example, Alternatively or additionally, a stripe width and/or a stripe spacing can also be varied. The patterns can additionally be oriented differently in dependence on the direction of illumination.

The patterns can furthermore also be adapted to the expected or presumed size of the objects. This means that finer patterns can be used with smaller objects than with larger objects.

The shadows cast of object edges are directly amplified due to the strip lighting, whereby the contour and thus the boundary of the objects can be detected particularly well by the camera. In addition, the objects can be recognized more accurately due to an additional depth recovery in accordance with a light sectioning process. The depth recovery is possible due to jumps of the stripes at the object edges or at object transitions.

The first and second illumination units are preferably activated one after the other, with the camera detecting the objects and respectively generating a two-dimensional image on activation of each illumination unit. In this manner, the objects can be detected by the camera under light incident from different directions, whereby the boundaries of the objects can be recognized better by the shadows cast in different directions independently of the spatial location of the objects. Alternatively, a consecutive illumination from different directions of illumination can also take place. For example, the patterns can be generated from four directions after one another, with the patterns each being rotated by 90° with respect to one another.

In accordance with a further development of the embodiment utilizing stripe patterns, a respective edge image is generated from the two-dimensional images generated by the camera, in particular by means of gradient filtering, with the edge images being fused to a second result image by means of a minimum formation. The gradient filtering can take place in this respect in the direction which corresponds to the direction of illumination of the respective illumination unit which was active on the generation of the two-dimensional image. A matrix edge filter can also be used instead of the gradient filtering. The second result image is thus based on two two-dimensional images which are generated by the camera and which were taken with an activated first or second illumination unit.

In accordance with a further advantageous embodiment, the boundaries of the objects are determined in the first result image or in the second result image, in particular in that the result image is correlated with a template, preferably an L-shaped template. In addition, the respective center of mass of the objects can be determined from the boundaries of the objects.

The edges of the objects are emphasized in the result images so that the boundaries of the objects can be determined in a simple manner. With knowledge of the shape of the objects, a template can in particular be correlated with the result image to determine the presence as well as the size and position of the objects. An L-shaped template is preferably used for parallelepiped shaped objects with whose aid the corners of the parallelepiped shaped objects can be found. With round or cylindrical objects, circular templates can be used instead. With corresponding prior knowledge of the shape of the objects to be gripped, the template used can be selected or adapted accordingly.

To determine the geometrical center of mass of a respective object, the center of mass can first be determined in the viewing plane of the camera, that is on the basis of the two-dimensional images or of the result image. The center of mass in the viewing plane can subsequently be combined to form a spatial center of mass with the aid of the distance information of the 3D sensor and the associated height of the object. The gripping points can now be determined in the already explained manner using the now known spatial position and extent of the object.

It is in this respect immaterial for the determination of the respective centers of mass whether a first result image or a second result image is used for the determination of the boundaries of the objects. The first and the second result images are admittedly generated with the aid of different illumination approaches, but the resulting first and second result images show the emphasized edges of the objects independently of the illumination approach.

In accordance with a further advantageous embodiment, the boundaries of the objects are determined using the first and second result images, in particular by a mean value formation. In this manner, a particularly robust localization of gripping points is made possible since possible inaccuracies in an illumination approach can be compensated by the other illumination approach. It is in particular of advantage In this respect that the different illumination approaches are based on different basic ideas, namely on the elimination of shadows, on the one hand, and on the direct amplification of shadows cast, on the other hand.

For the determination of the first and second result images, for example, four two-dimensional images can thus be used one after the other with a homogeneous illumination from four spatial directions and two two-dimensional images can be used with a stripe pattern projected from different directions.

A first result image and a second result image are preferably generated a multiple of times, with the boundaries of the objects being determined by means of a statistical evaluation of the result images. Due to the statistical evaluation and the multiple detection of the objects, the confidence in a determined gripping point can be increased even further. In addition, the confidence can be further increased by an additional depth recovery.

In accordance with a further advantageous embodiment, the emission spectrum of the illumination unit or of the illumination units is variable, with the emission spectrum in particular being adapted to a surface color of the objects. For example, RGB LEDs can be used having a variable light color whose light color is varied in an automated fashion for so long until a maximum contrast is present in the two-dimensional images of the camera. The light color of the illumination can in particular also vary temporally and/or cyclically.

The maximum contrast is in particular helpful on the use of a stripe pattern, wherein an interfering texture of the objects can advantageously be suppressed at maximum contrast. Blue lettering can, for example, be "masked" by the use of a red lighting.

The use of infrared light is alternatively also possible, wherein likewise interfering textures can be masked by infrared light. In addition, infrared light is not visible to humans so that such a lighting is not perceived as disturbing.

In accordance with a further advantageous embodiment, the objects are arranged such that, viewed from the position of the camera, the free area between two objects is smaller than 10%, preferably smaller than 5%, particularly preferably smaller than 1%, of the area taken up by the two objects. This means that the objects are very close to one another and can have a spacing of a few centimeters or millimeters or can even be adjacent to one another. In this manner, the objects to be picked themselves take up less room, whereby the space requirements of an automation plant processing the objects can also be reduced. It is nevertheless possible reliably to discriminate the objects using the method in accordance with the invention. The above areal indications in this respect refer to the view of the camera or to the two-dimensional image generated by the camera.

The invention furthermore relates to a method for the gripping of objects, wherein the gripping points of the objects are localized in the above-described manner and the objects are gripped and moved one after the other by a robot using a gripping apparatus. The spatial position of the objects and the associated gripping points are thus transmitted to a robot, whereupon the robot can grip the objects by the gripping apparatus and can move them to a destination position. The spatial positions of the gripping points and the alignment of the objects can be communicated to the robot for this purpose.

In addition, the invention relates to an apparatus for the localization of gripping points of objects using a support surface for the support of the objects, having a first, second, third and fourth illumination unit which preferably define a common plane, having a camera which is arranged spaced apart from the illumination units and having a 3D sensor which is arranged spaced apart from the camera and from the illumination units.

The apparatus can alternatively also only have a first and a second illumination unit which are configured for a strip illumination of the objects.

The statements on the method in accordance with the invention apply accordingly to the apparatus in accordance with the invention.

All the components of the apparatus are preferably attached to a common rack, whereby the illumination units, the 3D sensor and the camera can be in fixed positions relative to one another. The rack can be movable or can be configured as a self-propelled vehicle.

The apparatus can furthermore comprise a control unit which controls the illumination units, the camera and the 3D sensor and which processes the images or data generated by the camera and the 3D sensor. The control unit can also be coupled with a conveyor belt, a gripping robot and the like in order, for example, to allow an automatic gripping of objects delivered on the conveyor belt.

Figure 2:
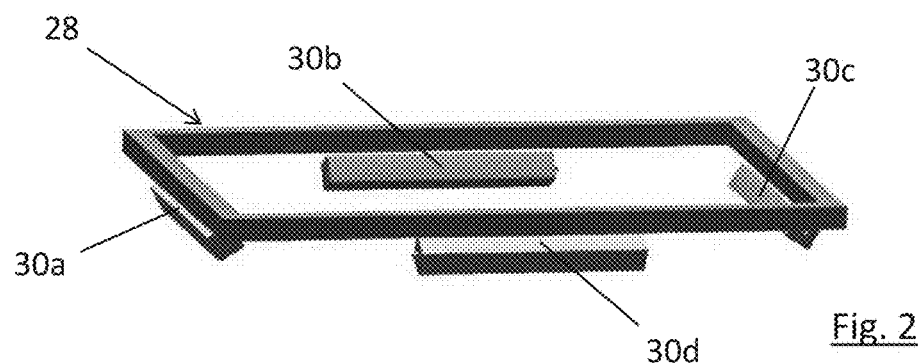
Figures 3, 4:
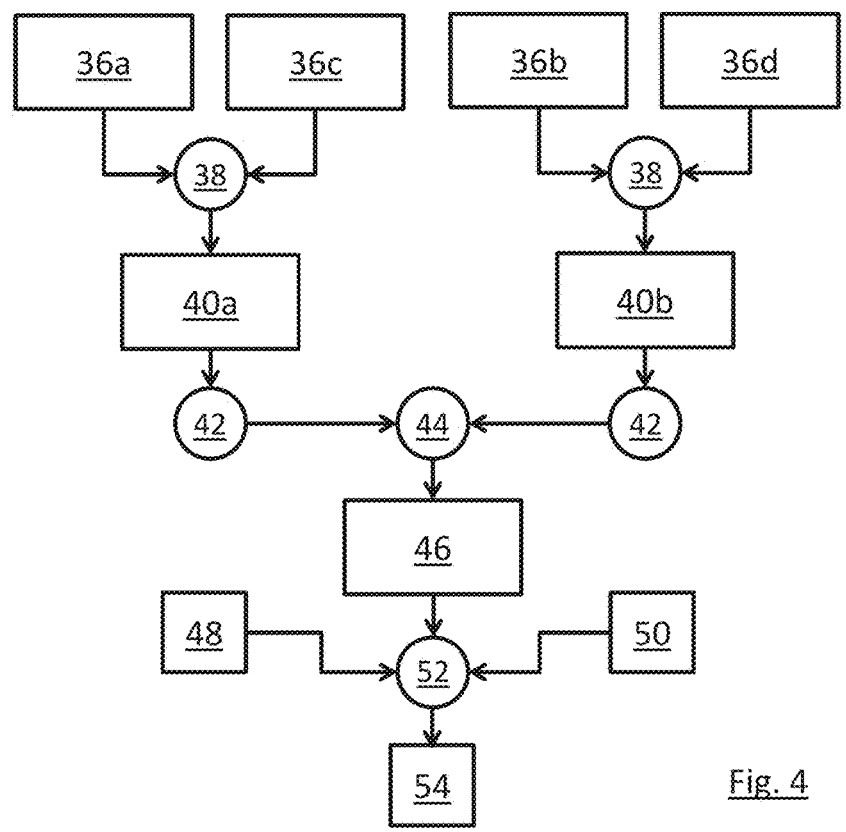

The invention will be described in the following purely by way of example with reference to the enclosed drawings. There are shown:

FIG. 1 a perspective view of an apparatus in accordance with the invention for the localization of gripping points of objects;

FIG. 2 a perspective view of the illumination units of FIG. 1;

FIG. 3 a plurality of objects in a plan view; and

FIG. 4 a schematic process flow for the localization of gripping points.

FIG. 1 shows an apparatus 10 for the localization of gripping points of objects 12. The objects 12 are arranged in a transport container 14 which lies on a support surface 16. A rack 18 is arranged on the support surface 16 and has a substantially inverted U shape. A CCD camera 26 is fastened centrally to an upper cross-member 20 of the rack 18.

The rack 18 additionally comprises a middle cross-member 24 to which a laser scanner 22 is fastened which serves as a 3D sensor and is directed to the objects 12. The middle cross-member 24 has a U shape which is arranged perpendicular to the U shape of the rack 18, whereby the laser scanner 22 is positioned off-center to the rack 18 and does not impede the view of the camera 26 toward the objects 12. The CCD camera 26 is likewise directed to the objects 12.

The rack 18 further comprises a lower cross-member 28 which is arranged between the middle cross-member 24 and the support surface 16. The lower cross-member 28 is rectangular and is arranged perpendicular to the plane of extent of the U shape of the rack 18. The lower cross-member 28 extends at both sides of the U shape of the rack 18, with the objects 12 being arranged beneath the lower cross-member 28 and preferably coming to lie, viewed from the camera 26, within the lower cross-member 28.

The lower cross-member 28 is shown more exactly in FIG. 2 and has a respective illumination unit 30a, 30b, 30c, 30d at each of its sides. Due to the arrangement at the rectangular lower cross-member 28, the illumination units 30a, 30b, 30c, 30d define a common plane. The illumination units 30a, 30b, 30c, 30d are arranged pivotably at the lower cross-member 28 to be able to adapt the direction of illumination to objects 12 of different heights.

The illumination units 30a, 30b, 30c, 30d comprise strips of RGB LEDs (red-green-blue light-emitting diodes) as illuminants whose light colors are each individually variable. Additionally or alternatively, two projectors can also be attached as illumination units (not shown) to the lower cross-member 28 for a strip-shaped illumination and can illuminate the objects 12.

As shown in FIG. 1, the rack 18 comprises feet 32 standing on the support surface 16. A switch cabinet 34 in which a control unit (not shown) is accommodated is attached to a foot 32.

FIG. 3 shows a two-dimensional image of the objects 12 in the transport container 14 taken by the CCD camera 26. The objects 12 are arranged close to one other in the transport container 14 so that the free area between the objects 12 is smaller than 5% of the space of the image taken up by a respective two adjacent objects 12.

The determination of gripping points is shown schematically in FIG. 4. In this respect, four two-dimensional images 36a, 36b, 36c, 36d are first taken by the CCD camera 26, with the illumination unit 30a being active on the taking of the two-dimensional image 36a. The illumination unit 30b is correspondingly activated on a taking of the image 36b. All four images 36a, 36b, 36c, 36d are named accordingly.

A maximum image 40a is subsequently generated from a respective two images 36 taken with an oppositely disposed illumination by means of maximum formation 38 from the images 36a and 36c and a maximum image 40b is generated from the images 36b and 36d. Subsequently, the maximum images 40a, 40b are each subjected to a gradient filtering 42 and are fused to a first result image 46 by means of a minimum formation 44.

The boundaries of the object 12 as well as its spatial location and its center of mass are determined from the first result image 46 in a processing step 52 by means of distance information which is determined by the laser scanner and which indicates the height of the object 12 above the support surface 16 and from an L-shaped template 50. The gripping points 54 are subsequently determined in the processing step 52 from the center of mass and from the boundary of the object 12.

The determination of the gripping points 54 is carried out by the control unit, wherein the gripping points 54 are subsequently transmitted by the control unit to a picking robot (not shown) which removes the individual objects 12 from the transport container 14 and supplies them to a further processing.

REFERENCE NUMERAL LIST 10 apparatus
12 objects
14 transport container
16 support surface
18 rack
20 upper cross-member
22 laser scanner
24 middle cross-member
26 CCD camera
28 lower cross-member
30a-30d illumination unit
32 foot
34 switch cabinet
36a-36d two-dimensional image
38 maximum formation
40a, 40b maximum image
42 gradient filtering
44 minimum formation
46 first result image
48 distance information
50 template
52 processing step
54 gripping point

The invention claimed is:

1. A method for the localization of gripping points of objects, wherein
the objects are scanned by means of a 3D sensor;
the objects are illuminated by means of at least one first illumination unit while the objects are detected by means of a camera;
wherein the relative positions of the 3D sensor, of the first illumination unit and of the camera with respect to one another are known and the 3D sensor, the first illumination unit and the camera are arranged in a fixed position with respect to one another;
the boundaries of the objects are determined from a two-dimensional image generated by the camera;
a spatial position of the objects is determined from detected distance information of the 3D sensor and from the two-dimensional image;
the gripping points for the objects are determined from the boundaries and from the spatial position of the objects;
the objects are also at least illuminated by a second, third and fourth illumination unit while the objects are detected by means of the camera, with the illumination units being arranged spatially offset from one another;
the illumination units are activated one after the other and the camera detects the objects on an activation of each illumination unit and respectively generates a two-dimensional image; and a maximum image is generated from a respective two two-dimensional images generated by the camera, wherein
 a gradient filtering is carried out on the maximum image to generate an edge image; and
 a respective two edge images are fused to a first result image by means of a minimum formation.

2. The method in accordance with claim 1,
wherein the boundaries of the objects in the result image are determined; and the respective center of mass of the objects is determined from the boundaries of the objects.

3. The method in accordance with claim 2,
wherein the result image is correlated with a template.

4. The method in accordance with the claim 1,
wherein the boundaries of the objects are determined using the first and second result images.

5. The method in accordance with claim 4, the boundaries of the objects are determined using the first and second result images by a mean value formation.

6. The method in accordance with claim 1,
wherein an emission spectrum of the illumination unit or of the illumination units is variable.

7. The method in accordance with claim 6,
wherein the emission spectrum is adapted to the objects.

8. The method in accordance with claim 7,
wherein the emission spectrum is adapted to a surface color of the objects.

9. The method in accordance with claim 1,
wherein the illumination unit or the illumination units emit infrared light.

10. The method in accordance with claim 1,
wherein the objects are arranged such that, viewed from the position of the camera, the free area between two objects is smaller than 10% of the area taken up by the two objects.

11. A method for the gripping of objects, wherein
the gripping points of the objects are localized in accordance with the method of claim 1 and the objects are gripped and moved one after the other by a robot using a gripping apparatus.

12. A method for the localization of gripping points of objects, wherein
 the objects are scanned by means of a 3D sensor;
 the objects are illuminated by means of at least one first illumination unit while the objects are detected by means of a camera;
 wherein the relative positions of the 3D sensor, of the first illumination unit and of the camera with respect to one another are known and the 3D sensor, the first illumination unit and the camera are arranged in a fixed position with respect to one another;
 the boundaries of the objects are determined from a two-dimensional image generated by the camera;
 a spatial position of the objects is determined from detected distance information of the 3D sensor and from the two-dimensional image;
 the gripping points for the objects are determined from the boundaries and from the spatial position of the objects;
 the objects are illuminated with a stripe pattern by the first and/or by a second illumination unit while the objects are detected by means of the camera;
 the first and second illumination units are activated one after the other and the camera detects the objects on an activation of each illumination unit and respectively generates a two-dimensional image; and
 a respective edge image is generated from the two-dimensional images generated by the camera, with the edge images being fused to a second result image by means of a minimum formation.

13. The method in accordance with claim 12,
wherein the respective edge image is generated by means of gradient filtering.

14. The method in accordance with claim 12,
wherein the boundaries of the objects in the result image are determined; and the respective center of mass of the objects is determined from the boundaries of the objects.

15. The method in accordance with claim 14,
wherein the result image is correlated with a template.

16. The method in accordance with the claim 12,
wherein the boundaries of the objects are determined using the first and second result images.

17. The method in accordance with claim 16, the boundaries of the objects are determined using the first and second result images by a mean value formation.

18. The method in accordance with claim 16,
wherein a first and second result image is produced a plurality of times, with the boundaries of the objects being determined by means of a statistical evaluation of the result images.

19. A method for the gripping of objects, wherein
the gripping points of the objects are localized in accordance with the method of claim 12 and the objects are gripped and moved one after the other by a robot using a gripping apparatus.

* * * * *